United States Patent
Ohori

(10) Patent No.: US 12,500,472 B2
(45) Date of Patent: Dec. 16, 2025

(54) MOTOR DEVICE

(71) Applicant: MITSUBA Corporation, Gunma (JP)

(72) Inventor: Ryo Ohori, Gunma (JP)

(73) Assignee: MITSUBA Corporation, Gunma (JP)

( * ) Notice: Subject to any disclaimer, the term of this patent is extended or adjusted under 35 U.S.C. 154(b) by 206 days.

(21) Appl. No.: 18/542,744

(22) Filed: Dec. 17, 2023

(65) Prior Publication Data

US 2024/0339887 A1 Oct. 10, 2024

(30) Foreign Application Priority Data

Apr. 6, 2023 (JP) .................................. 2023-062001

(51) Int. Cl.
| | |
|---|---|
| H02K 5/173 | (2006.01) |
| B60S 1/08 | (2006.01) |
| H02K 7/08 | (2006.01) |
| H02K 7/116 | (2006.01) |
| H02K 21/22 | (2006.01) |

(52) U.S. Cl.
CPC .............. *H02K 5/1735* (2013.01); *B60S 1/08* (2013.01); *H02K 7/085* (2013.01); *H02K 7/116* (2013.01); *H02K 21/22* (2013.01)

(58) Field of Classification Search
CPC ........ B60S 1/08; H02K 21/22; H02K 5/1735; H02K 7/083; H02K 7/085; H02K 7/116
See application file for complete search history.

(56) References Cited

U.S. PATENT DOCUMENTS

| | | | |
|---|---|---|---|
| 6,701,803 B1* | 3/2004 | Tamai .................... | H02K 7/116 74/640 |
| 2023/0046567 A1* | 2/2023 | Matsushita .......... | H02K 49/102 |

FOREIGN PATENT DOCUMENTS

| | | |
|---|---|---|
| JP | 2020018035 | 1/2020 |
| JP | 2020018035 A * | 1/2020 |

OTHER PUBLICATIONS

JP-2020018035-A, all pages (Year: 2020).*

* cited by examiner

*Primary Examiner* — Naishadh N Desai
(74) *Attorney, Agent, or Firm* — JCIPRNET

(57) ABSTRACT

A wiper motor includes a rotor shaft, a rotor yoke, a stator core, a first ball bearing, and a second ball bearing. The rotor shaft is configured parallel to an output shaft and rotates a gear portion. The rotor yoke is fixed to the rotor shaft. The stator core has a cylindrical portion. A part of the rotor shaft and a part of the rotor yoke are inserted into the cylindrical portion. The first ball bearing is fixed to a motor housing. The second ball bearing is fixed to a base plate. At least a part of each of the first ball bearing and the second ball bearing B2 is configured inside the cylindrical portion.

9 Claims, 13 Drawing Sheets

MOTOR DEVICE

CROSS-REFERENCE TO RELATED APPLICATION

This application claims the priority benefits of Japanese application no. 2023-062001, filed on Apr. 6, 2023. The entirety of the above-mentioned patent application is hereby incorporated by reference herein and made a part of this specification.

BACKGROUND

Technical Field

The disclosure relates to a motor device.

Description of Related Art

In a motor with a speed reduction mechanism described in Patent Document 1 (Japanese Patent Application Laid-Open (JP-A) No. 2020-018035), the pinion gear and the output shaft are parallel to each other. The tip side of the pinion gear is rotatably supported by a first ball bearing. The based end side of the pinion gear is rotatably supported by a second ball bearing.

In the motor with the speed reduction mechanism described in Patent Document 1, only the second ball bearing supports the pinion gear near where the pinion gear (rotor shaft) is fixed to the rotor (rotor yoke). Here, when the rotor yoke whirls around while the rotor yoke is rotating, only the second ball bearing supports the rotor shaft fixed to the rotor yoke. For this reason, the whirling of the rotor yoke is unable to be resisted, and the rotor shaft may deflect. In other words, there is room for improvement in suppressing the deflection of the rotor shaft.

An object of the disclosure is to provide a motor device that may suppress deflection of a rotor shaft when a rotor yoke is rotating.

SUMMARY

The motor device in one aspect of the disclosure includes: a rotor shaft, configured parallel to an output shaft provided on a gear portion and rotating the gear portion; a rotor yoke, fixed to the rotor shaft; a stator core, having a cylindrical portion into which a part of the rotor shaft and a part of the rotor yoke are inserted; a first bearing, fixed to a motor housing, which is positioned on one side in an axial direction of the rotor shaft with respect to the stator core, and rotatably supporting the rotor shaft; and a second bearing, fixed to a base plate, which is positioned on other side in the axial direction with respect to the stator core, and rotatably supporting the rotor shaft. At least a part of each of the first bearing and the second bearing is configured inside the cylindrical portion.

DESCRIPTION OF THE EMBODIMENTS

Figure 1:
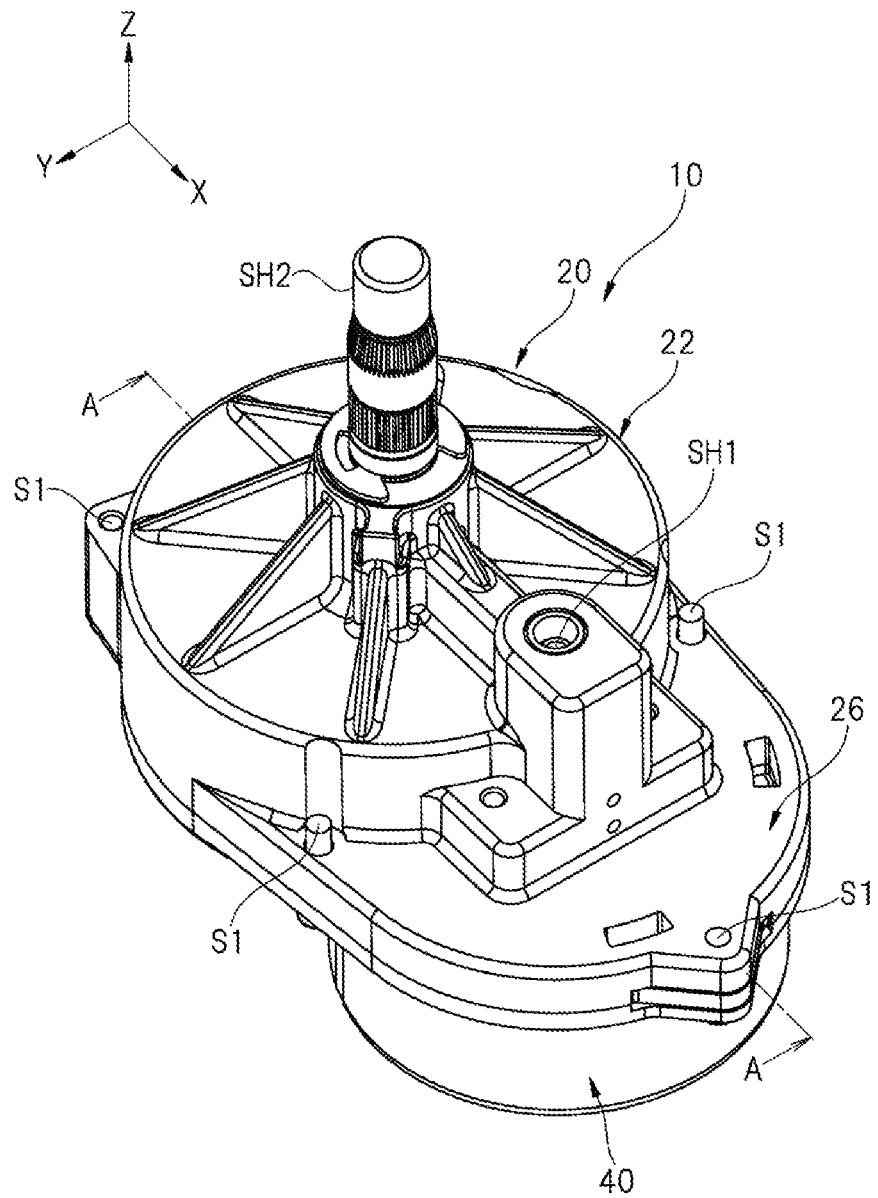
FIG. 1 is a perspective view of the wiper motor according to one embodiment.

Hereinafter, one embodiment of the wiper motor 10 of the disclosure is described with reference to FIG. 1 to FIG. 13B. In addition, from FIG. 1 to FIG. 13B, the same or similar components are given the same reference numerals, and redundant descriptions will be omitted. Further, in FIG. 1 to FIG. 13B, the scale and dimensions of each component may be exaggerated, or some components may be omitted. In the following description, unless otherwise specified, terms such as "first" and "second" are used only to distinguish components from each other, and do not represent a specific rank or order.

In the following description, the "axial direction" means the direction in which the central axis CA (FIG. 2) of the rotor shaft SH1 (FIG. 2), which will be described later, extends. The "circumferential direction" means the circumferential direction of the cylindrical portion 74 (FIG. 6), which will be described later. The "radial direction" means the radial direction of the cylindrical portion 74. The axial direction and the radial direction are orthogonal.

Here, the axial direction is referred to as the Z direction and is indicated by the arrow Z. The Z direction is, for example, the up-down direction. The tip end side of the arrow Z corresponds to the upper side, and the base end side of the arrow Z corresponds to the lower side. The lower side in the Z direction is an example of one side in the axial direction. The upper side in the Z direction is an example of the other side in the axial direction.

A direction in which the rotor shaft SH1 and an output shaft SH2 (FIG. 2), which will be described later, are aligned is referred to as the X direction and is indicated by the arrow X. The X direction is, for example, the left-right direction. The tip end side of the arrow X corresponds to the right side, and the base end side of the arrow X corresponds to the left side. A direction that is orthogonal to both the X direction and the Z direction is referred to as the Y direction and is indicated by the arrow Y. The Y direction is, for example, the front-rear direction. The tip end side of the arrow Y corresponds to the front side, and the base end side of the arrow Y corresponds to the back side.

[Overview of Wiper Motor]

The wiper motor 10 shown in FIG. 1 is a drive source for a wiper device (not shown) mounted in the front of a vehicle such as an automobile. The wiper motor 10 is an example of a motor device, and is mounted near a windshield (not shown) of a vehicle. The wiper motor 10 is activated by operating a wiper switch (not shown) provided in the interior of a vehicle. A wiper member (not shown) swingably provided on the windshield performs a wiping operation while reciprocating due to the operation of the wiper motor 10.

The wiper motor 10 includes a gear portion 20 and a motor body portion 40. The gear portion 20 and the motor body portion 40 are firmly fixed by multiple fixing screws S1.

[Gear Portion]

Figure 2:
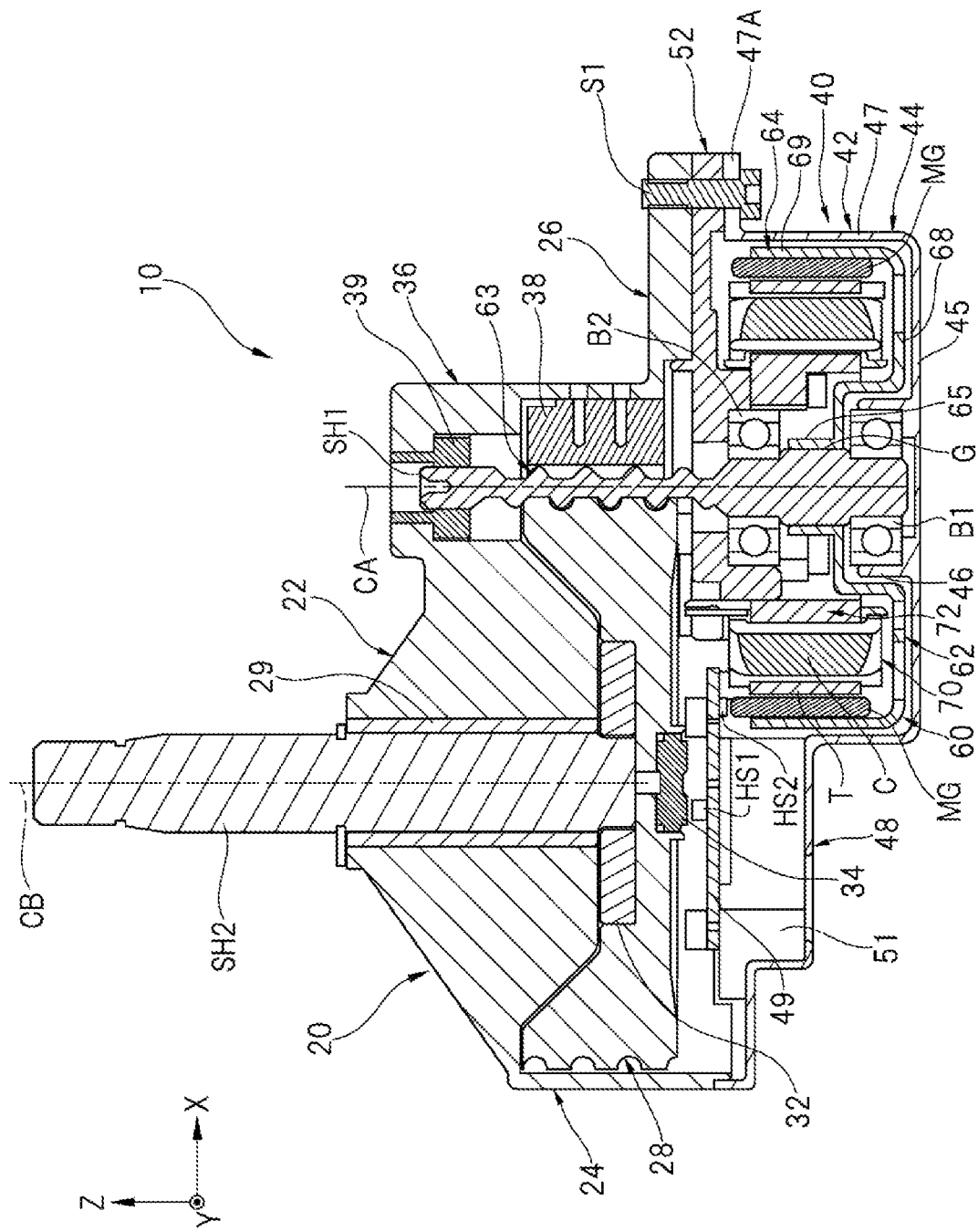
FIG. 2 is a cross-sectional view taken along the line A-A in FIG. 1.

As shown in FIG. 2, the gear portion 20 includes a gear housing 22, a helical gear 28, and an output shaft SH2. In other words, the output shaft SH2 is provided in the gear portion 20. The gear portion 20 functions as a speed reduction mechanism portion.

The gear housing 22 is formed into a substantially stepped dish shape by injection molding a molten aluminum material or the like. In addition, the gear housing 22 includes a gear accommodating portion 24, a base plate attachment portion 26, and a bearing member accommodating portion 36. The gear accommodating portion 24 rotatably accommodates a helical gear 28. The gear housing 22 is provided with a cylindrical bearing portion 29 that rotatably supports the output shaft SH2. As a result, the output shaft SH2 is supported by the gear housing 22 in a smooth and freely rotatable manner without rattle.

The output shaft SH2 is formed into a substantially columnar shape with a central axis CB in the Z direction. The lower end portion of the output shaft SH2 is fixed to a disk-shaped shaft fixing portion 32. The shaft fixing portion 32 is fixed to the central upper portion of the helical gear 28 by a pin and a screw (not shown). A substantially disk-shaped sensor magnet 34 is fixed to the central lower portion of the helical gear 28. The sensor magnet 34 is used to detect the rotational position of the helical gear 28.

The bearing member accommodating portion 36 is positioned on a position shifted to the right in the X direction with respect to the output shaft SH2. A bearing member 39 is accommodated in the interior of the bearing member accommodating portion 36. The bearing member 39 rotatably supports the upper end portion of the rotor shaft SH1, which will be described later. In addition, the bearing member 39 regulates the movement of the rotor shaft SH1 in the radial direction, but does not regulate the movement of the rotor shaft SH1 in the thrust direction.

A backup member 38 is fixed to a lower portion of the gear accommodating portion 24 relative to the bearing member accommodating portion 36. The backup member 38 is made of a resin material such as plastic. The backup member 38 is configured with a small gap with the outer circumferential surface of the pinion gear 63, which will be described later. Further, the backup member 38 is configured to cover half of the circumferential direction of the pinion gear 63. In this way, the backup member 38 prevents the rotor shaft SH1 (pinion gear 63) from being bent when a large external force is applied to the output shaft SH2 and the pinion gear 63 receives a pushing force from the helical gear 28.

[Motor Body Portion]

As shown in FIG. 2, the motor body portion 40 includes a motor housing 42, a base plate 52, a first ball bearing B1, a second ball bearing B2, and a brushless motor portion 60.

<Motor Housing>

The motor housing 42 is formed into a substantially stepped dish shape by injection molding a molten aluminum material or the like. The motor housing 42 is position on the lower side in the Z direction with respect to the stator core 72, which will be described later. The motor housing 42 includes a motor accommodating portion 44 and a base mounting portion 48.

The motor accommodating portion 44 has a bottom wall 45, an attachment wall 46, and a side wall 47. The interior of the motor accommodating portion 44 accommodates a brushless motor portion 60. The bottom wall 45 is formed into a substantially disk shape having a predetermined thickness in the Z direction. The attachment wall 46 is a cylindrical wall portion that stands upright on the upper side in the Z direction from the center portion of the bottom wall 45. The attachment wall 46 is an example of an attachment portion to which the first ball bearing B1, which will be described later, is attached.

The side wall 47 stands upright on the upper side in the Z direction from the outer edge portion of the bottom wall 45. At a part of the upper end portion of the side wall 47, an attachment flange 47A is provided along the X-Y plane. The attachment flange 47A and the base plate attachment portion 26 sandwich the base plate 52 in the Z direction. The attachment flange 47A and the base plate 52 are fixed to the base plate attachment portion 26 by the fixing screw S1. That is, the motor housing 42 is fixed to the base plate 52.

The base mounting portion 48 is positioned on the left side of the motor accommodating portion 44 in the X direction and adjacent to the motor accommodating portion 44. Further, the base mounting portion 48 is positioned on the lower side relative to the output shaft SH2. A holding member 51 that holds a sensor board 49 is mounted to the inside of the base mounting portion 48.

The sensor board 49, for example, is provided with one hall sensor HS1 and three hall sensors HS2. In addition, in FIG. 2, only one of the three hall sensors HS2 is shown, and illustration of the remaining two hall sensors HS2 is omitted.

The hall sensor HS1 detects the rotational position of the sensor magnet 34. That is, the hall sensor HS1 is used to detect the rotational positions of the helical gear 28 and the output shaft SH2. A controller (not shown) grasps the rotational state of the output shaft SH2 based on the detection signal from the hall sensor HS1.

The three hall sensors HS2 correspond to, for example, a U-phase, a V-phase, and a W-phase. The controller described above grasps the rotational state (rotation speed, rotation direction, etc.) of the rotor shaft SH1 based on the detection signal (square wave signal) from each of the hall sensors HS2 and accurately controls the rotational state of the rotor shaft SH1.

<Base Plate>

The base plate 52 covers the motor accommodating portion 44 from the upper side. The base plate 52 is positioned on the other side (upper side) in the Z direction with respect to the stator core 72.

Figure 3:
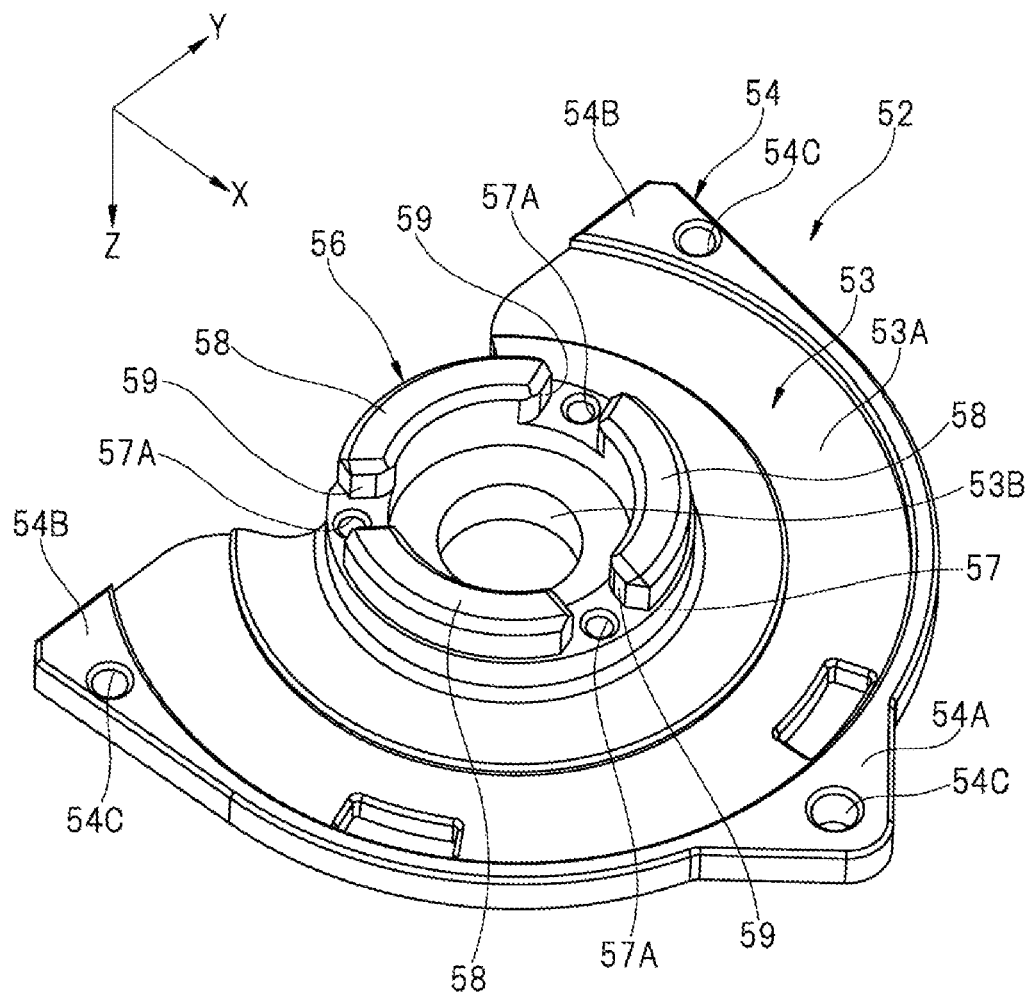
FIG. 3 is a perspective view of the base plate of the wiper motor in FIG. 1 viewed from one side in the axial direction.

FIG. 3 shows the base plate 52 as viewed diagonally from below. The base plate 52 is a member having a predetermined thickness in the Z direction. The base plate 52 has a main body part 53, an edge portion 54, and a holding portion 56.

(Main Body Part)

The main body portion 53 has a substantially D-shaped appearance when viewed from the Z direction. A groove portion 53A having a predetermined width in the radial direction is formed in the main body portion 53. Further, a circular through hole 53B is formed in the center portion of the main body portion 53, passing through the main body portion 53 in the Z direction. The rotor shaft SH1 (FIG. 2) is inserted into the through hole 53B.

(Edge Portion)

The edge portion 54 has an overhang portion 54A extending outward from the right end portion in the X direction of the main body portion 53 and two overhang portions 54B extending outward from two end portions in the Y direction of the main body portion 53, respectively. A fastening hole 54C penetrating in the Z direction is formed in each of the overhang portions 54A and 54B. The fixing screw S1 (FIG. 2) is fastened to the fastening hole 54C.

(Holding Portion)

The holding portion 56 is a portion that protrudes from the main body portion 53 to the lower side in the Z direction and surrounds the through hole 53B. The holding portion 56 includes, for example, a base portion 57 and three arc portions 58. The base portion 57 is a cylindrical wall portion surrounding the through hole 53B. Three fastening holes 57A are formed in the base portion 57 and are positioned at equal intervals in the circumferential direction.

The three arc portions 58 are wall portions that stand upright from the base portion 57 toward the lower side in the Z direction. The three arc portions 58 are positioned at equal intervals in the circumferential direction. Stepped portions 59 are portions where the three arc portions 58 are spaced at intervals in the circumferential direction. The fastening holes 57A are formed on the portions corresponding to the bottom portions of the stepped portions 59. The inner diameter of the base portion 57 and the inner diameter of the three arc portions 58 each have a size approximately equal to the outer diameter of the second ball bearing B2 (FIG. 2). In other words, the second ball bearing B2 is press-fitted inside the base portion 57 and the three arc portions 58. As a result, the holding portion 56 holds the second ball bearing B2 from the outer circumferential side.

<First Ball Bearing>

As shown in FIG. 2, the first ball bearing B1 is press-fitted inside the attachment wall 46. That is, the first ball bearing B1 is fixed to the motor housing 42. The first ball bearing B1 is an example of a first bearing. The first ball bearing B1 is positioned on the upper side in the Z direction with respect to the motor housing 42. The lower end portion in the Z direction of the rotor shaft SH1 is press-fitted into the first ball bearing B1. Thereby, the first ball bearing B1 rotatably supports the rotor shaft SH1.

<Second Ball Bearing>

The second ball bearing B2 is fixed to (or held by) the base plate 52. The second ball bearing B2 is an example of a second bearing. The second ball bearing B2 is positioned on the lower side in the Z direction with respect to the base plate 52. Further, the second ball bearing B2 is positioned on the upper side in the Z direction with respect to the first ball bearing B1. Another part in the Z direction of the rotor shaft SH1 (lower than the center) is press-fitted into the second ball bearing B2. Thereby, the second ball bearing B2 rotatably supports the rotor shaft SH1. In this way, the rotor shaft SH1 is rotatably supported by the first ball bearing B1, the second ball bearing B2, and the bearing member 39.

<Brushless Motor Portion>

Figure 4:
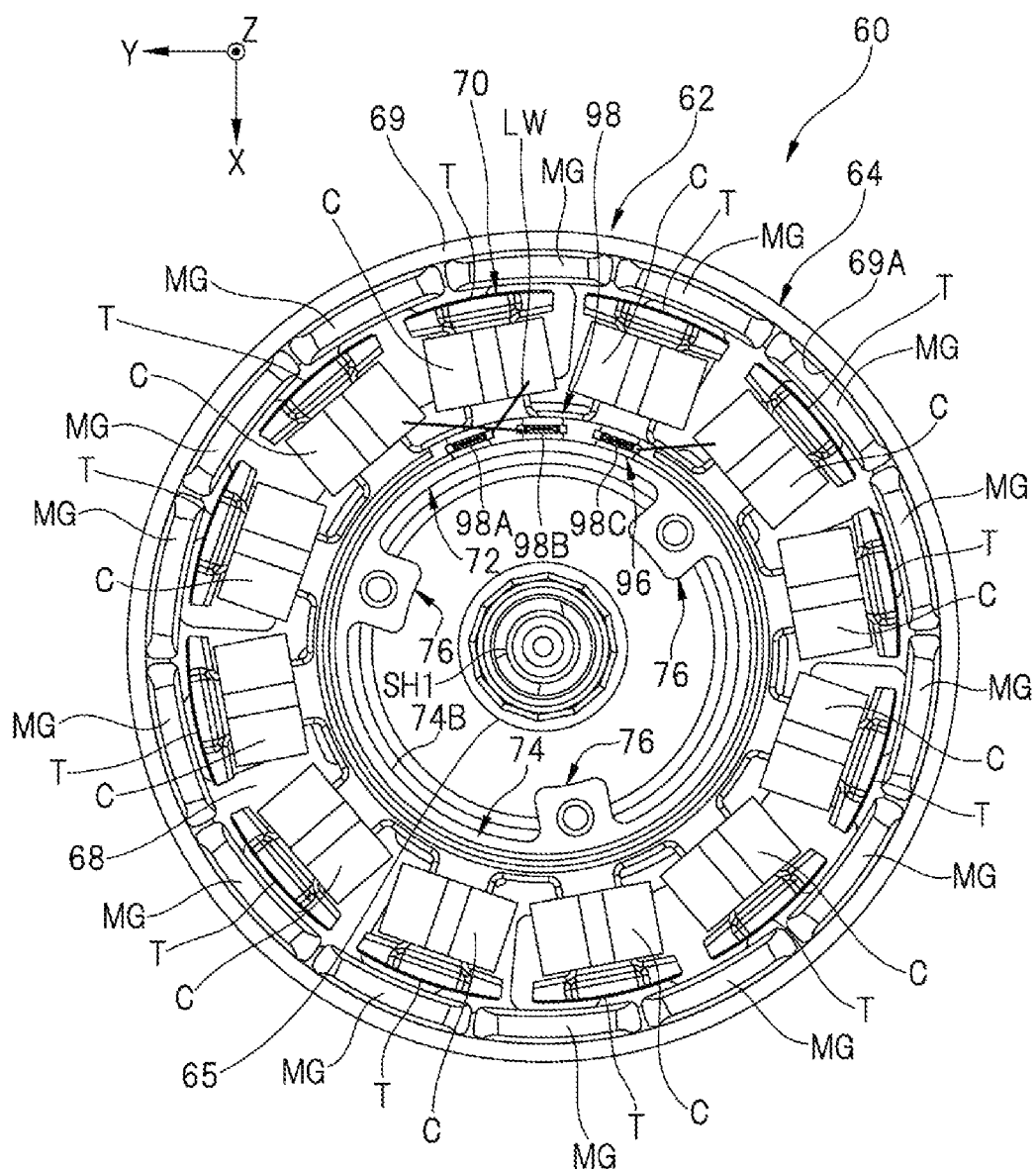
FIG. 4 is a plan view showing the stator unit and the rotor unit of the wiper motor in FIG. 1.

As shown in FIG. 4, the brushless motor portion 60 includes a rotor unit 62 and a stator unit 70.

(Rotor Unit)

The rotor unit 62 includes a rotor shaft SH1 made of a round steel bar and a rotor yoke 64 formed into a substantially dish shape.

<Rotor Shaft>

As shown in FIG. 2, the rotor shaft SH1 is spaced apart from the output shaft SH2 in the X direction and is aligned "parallel" in the Z direction. In addition, "parallel" in this embodiment means a configuration relationship between the two axes that includes a deviation due to an error within the allowable range, and does not mean only a configuration relationship in which the two axes are completely parallel.

The rotor shaft SH1 rotates the helical gear 28 of the gear portion 20. As described above, the lower portion in the Z direction of the rotor shaft SH1 is rotatably supported by the first ball bearing B1 and the second ball bearing B2. The upper end portion of the rotor shaft SH1 is rotatably supported by the bearing member 39.

The pinion gear 63 is integrally provided above the center in the Z direction of the rotor shaft SH1. The pinion gear 63 is formed into a spiral shape by knurling or the like (with one tooth). The pinion gear 63 is engaged with the helical gear 28. As a result, when the rotor shaft SH1 is rotated, the output shaft SH2 is rotated by rotating the helical gear 28. A diameter expansion portion G having a larger radius than other portions is provided below the center in the Z direction of the rotor shaft SH1.

<Rotor Yoke>

Figure 5:
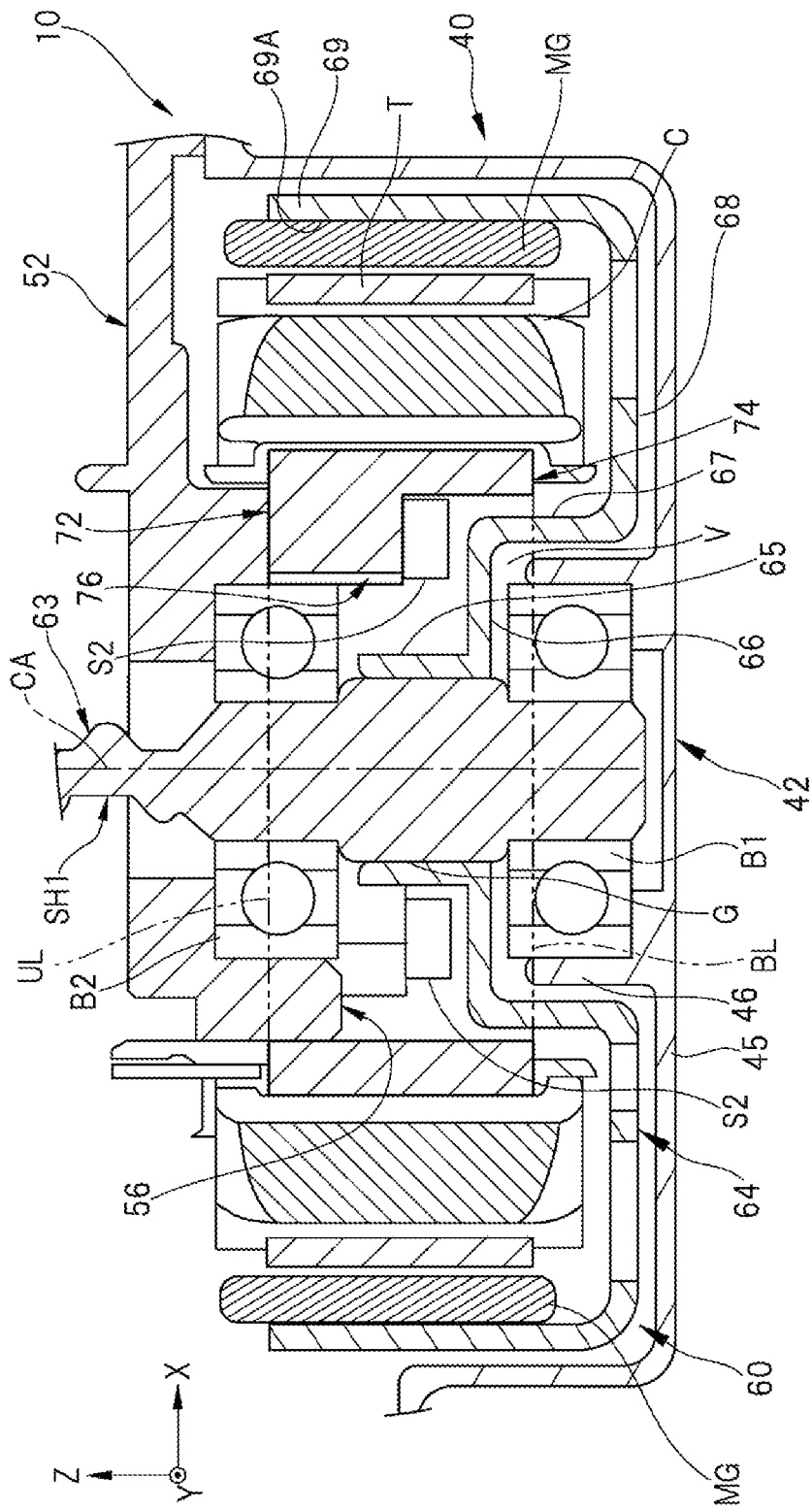
FIG. 5 is a partially enlarged cross-sectional view of the motor portion in FIG. 2.

FIG. 5 shows a part of the cross section of the motor body portion 40. The rotor yoke 64 is a member for rotating the rotor shaft SH1. The rotor yoke 64 is formed into a shape with a substantially U-shaped cross section by pressing a steel plate (magnetic material), etc. The rotor yoke 64 holds multiple magnets MG and is fixed to the rotor shaft SH1. Specifically, the rotor yoke 64 includes a boss portion 65, a flange 66, a vertical wall 67, a bottom wall 68, and a rotor side wall 69.

The boss portion 65 is a cylindrical portion having a central axis in the Z direction. The diameter expansion portion G is firmly fixed to the boss portion 65 by press-fitting. As described above, since the lower portion (base end side) of the rotor shaft SH1 is fixed to the boss portion 65, the rotor shaft SH1 is integrally rotated with the rotor yoke 64.

The flange 66 is an example of a flange portion formed toward the outside in the radial direction from the rotor shaft SH1. Specifically, the flange 66 extends from the lower end of the boss portion 65 to the outside in the radial direction. The flange 66 is an annular shaped plate portion having a predetermined thickness in the Z direction. The outer diameter of the flange 66 is smaller than the inner diameter of the stator core 72, which will be described later.

The vertical wall 67 is an example of a wall portion extending from the outer circumferential portion of the flange 66 to the lower side in the Z direction. The entire vertical wall 67 is formed into a cylindrical shape. The space surrounded by the flange 66 and the vertical wall 67 is called an accommodating space V. The accommodating space V is a space positioned inside (rotor shaft SH1 side) with respect to the stepped portion formed by the flange 66 and the vertical wall 67. In addition, the first ball bearing B1 is positioned in the accommodating space V.

The bottom wall 68 extends from the lower end portion of the vertical wall 67 toward the outside in the radial direction.

The bottom wall 68 is an annular shaped plate portion having a predetermined thickness in the Z direction. The bottom wall 68 is positioned below the stator core 72 and above the bottom wall 45, which will be described later. When viewed from the Z direction, the outer circumferential portion of the bottom wall 68 is positioned on the outside in the radial direction compared to the outer circumferential portion of the stator core 72.

The rotor side wall 69 is a portion that stands upright from the outer circumferential portion of the bottom wall 68 toward the upper side. The entire rotor side wall 69 is formed into a cylindrical shape. The rotor side wall 69 has an inner circumferential surface 69A.

As shown in FIG. 4, as an example, a 14-pole magnet MG is fixed to the inner circumferential surface 69A of the rotor side wall 69. The magnet MG is formed into a substantially tiled shape (substantially arc-shaped) when viewed from the Z direction. The 14-pole magnet MG is arranged at equal intervals in the circumferential direction of the rotor yoke 64 and is firmly fixed to the inner circumferential surface 69A using an epoxy resin adhesive. The stator core 72 is included in the inside in the radial direction for the 14-pole magnet MG.

(Stator Unit)

The stator unit 70 includes, for example, a stator core 72, an insulator 96, a terminal 98, and a conductive wire LW.

<Stator Core>

Figure 6:
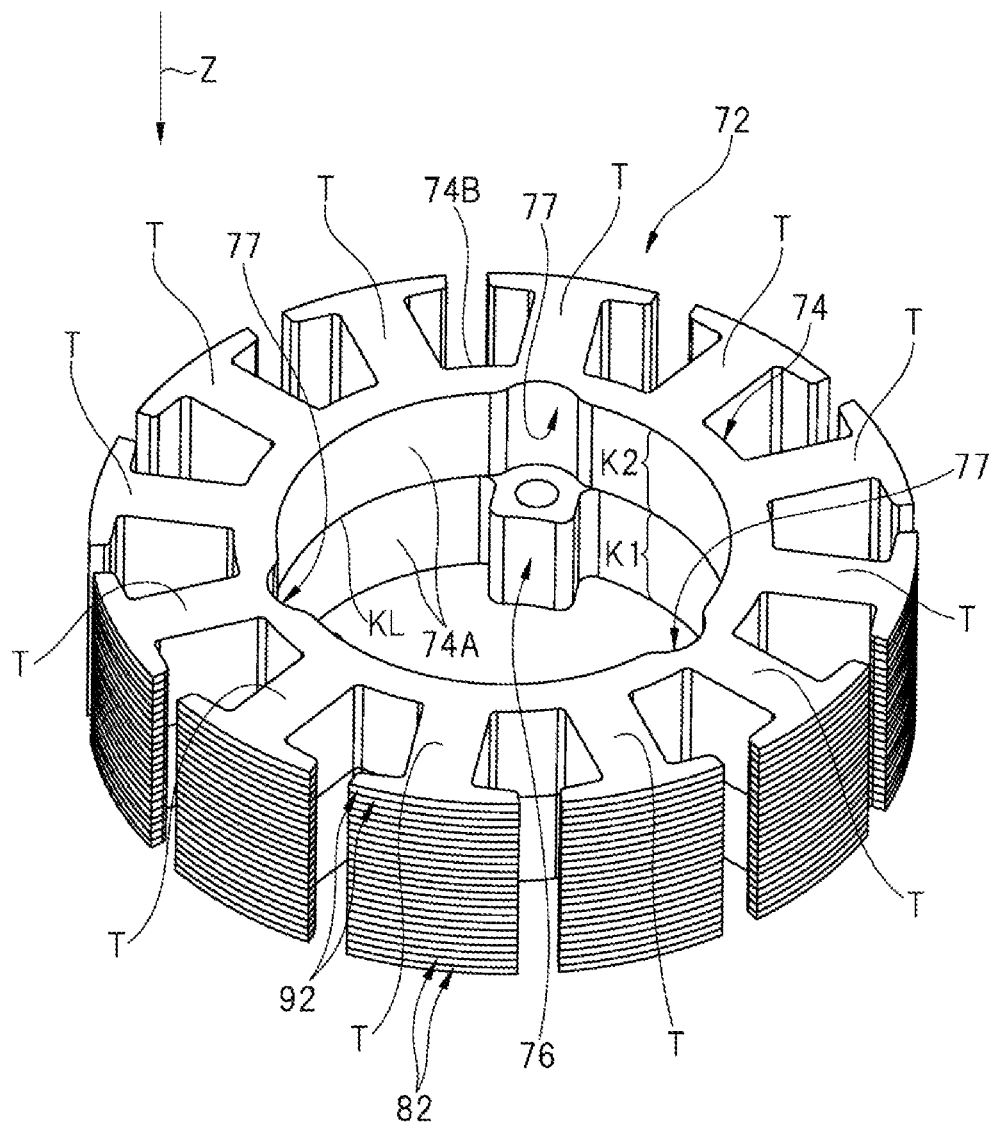
FIG. 6 is a perspective view of the stator core included in the stator unit in FIG. 3.

As shown in FIG. 6, the stator core 72 includes, for example, a cylindrical portion 74, twelve teeth T, three protruding portions 76 (FIG. 4), and three recessed portions 77. Furthermore, the stator core 72 includes multiple first core plates 82 and multiple second core plates 92, which are laminated in the Z direction, respectively. Among the stator core 72, a portion formed by multiple first core plates 82 is referred to as a first core portion K1, and a portion formed by multiple second core plates 92 is referred to as a second core portion K2. The first core portion K1 is positioned above the second core portion K2 in the Z direction.

In addition, in FIG. 6, multiple dividing lines representing the laminated state are shown only for the outer circumferential surface of the teeth T on the front side of the stator core 72. The dividing lines in other portions of the stator core 72 are omitted. Further, regarding the inner circumferential portion of the stator core 72, only the border line KL indicating the boundary between the first core portion K1 and the second core portion K2 is shown.

The cylindrical portion 74 has a central axis CA (FIG. 2) and extends in the Z direction. The cylindrical portion 74 has an inner circumferential surface 74A and an outer circumferential surface 74B. In addition, both the upper end surface and the lower end surface of the cylindrical portion 74 are flat surfaces. The size of the inner diameter of the cylindrical portion 74 is set to such a size that a space portion is formed between the rotor shaft SH1 (FIG. 2) and the inner circumferential surface 74A. Twelve teeth T project radially toward the outside in the radial direction from the outer circumferential surface 74B. Further, the twelve teeth T are arranged at equal intervals in the circumferential direction.

As shown in FIG. 4, in the stator core 72, each of the twelve teeth T is provided with a coil portion C. The coil portion C is a portion formed by the conductive wire LW having electrical conductivity being wound around the teeth T.

Figure 7:
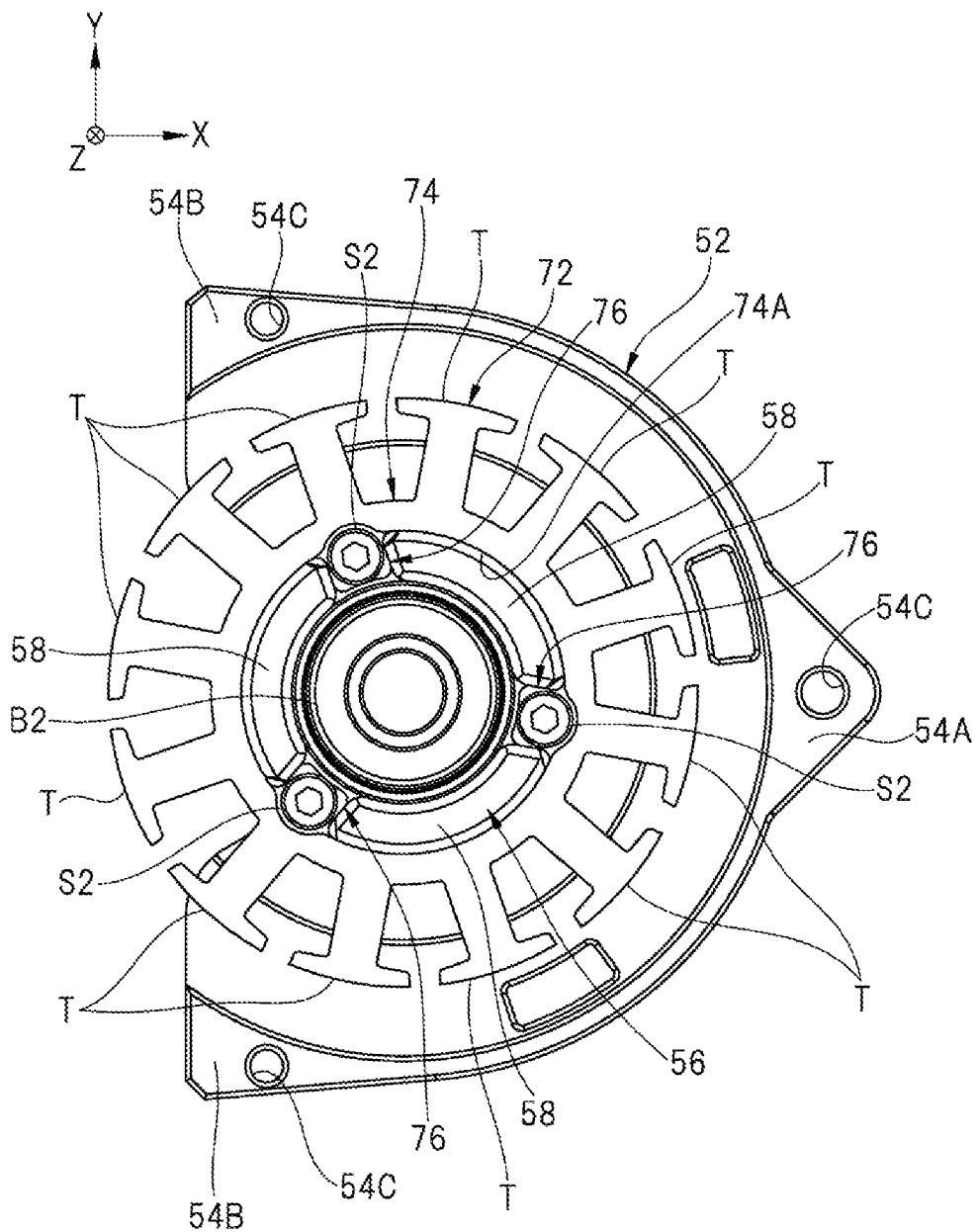
FIG. 7 is a bottom view showing the state in which the stator core is fixed to the base plate.

As shown in FIG. 7, three protruding portions 76 protrude from the inner circumferential surface 74A to the inside in the radial direction. The three protruding portions 76 are spaced at equal intervals in the circumferential direction.

The protruding portions 76 are each fixed to the base plate 52 by a fixing screw S2. The fixing screw S2 is an example of a screw member. The height of the protruding portions 76 in the Z direction is, for example, half the height of the stator core 72 in the Z direction.

Figure 8:
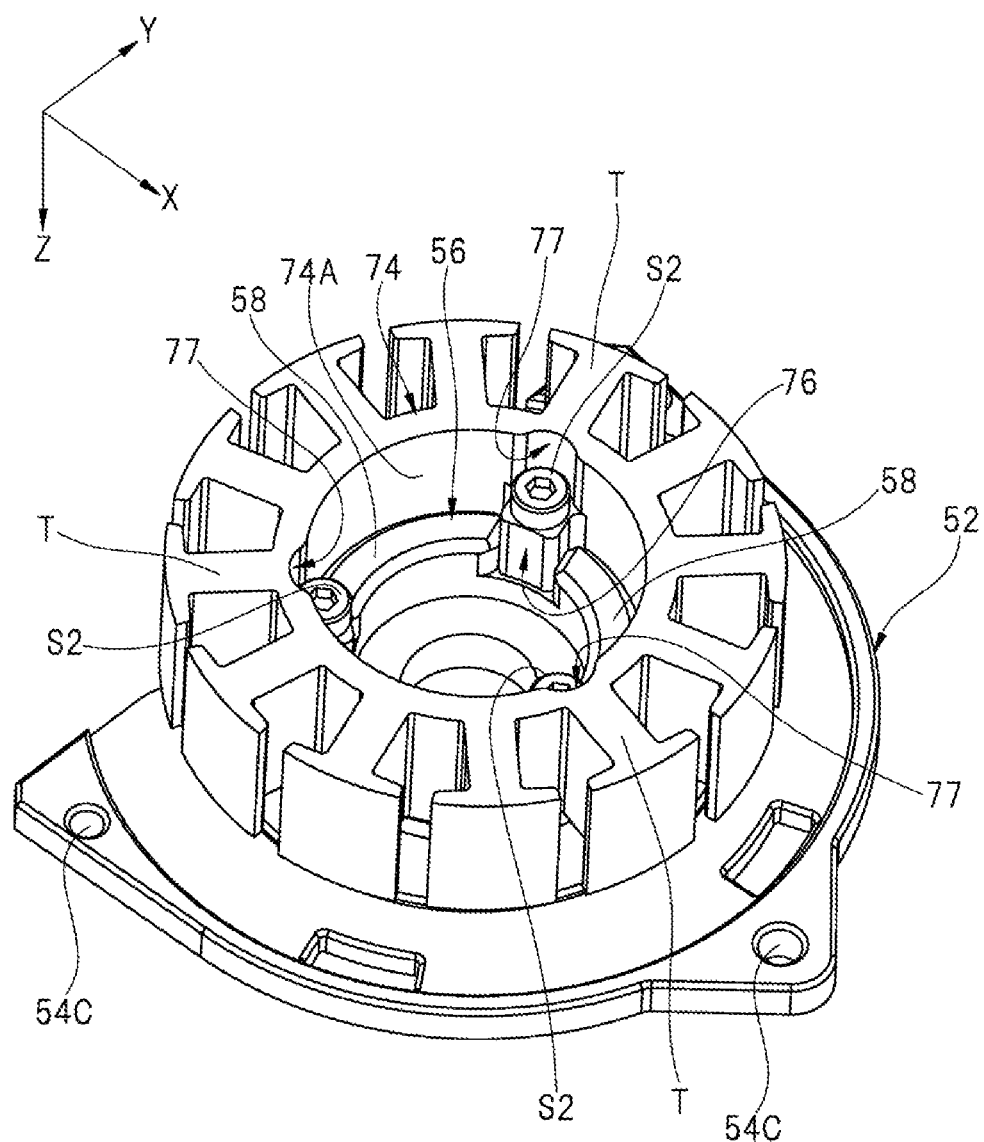
FIG. 8 is a perspective view showing the state in which the stator core is fixed to the base plate.

As shown in FIG. 8, the recessed portions 77 are provided on portions of the inner circumferential surface 74A positioned between the fixing screws S2 and the teeth T. Further, as an example, three recessed portions 77 are provided on the inner circumferential surface 74A. The three recessed portions 77 are portions recessed from the inner circumferential surface 74A toward the outside in the radial direction (toward the teeth T). The three recessed portions 77 are spaced at equal intervals in the circumferential direction.

When viewing the inner circumferential surface 74A from the center in the radial direction, the recessed portions 77 are aligned with the protruding portions 76 in the Z direction and are positioned on the lower side in the Z direction with respect to the protruding portions 76. The recessed portions 77 are portions cut out in an arc shape. The recessed portions 77 are positioned on the outside in the radial direction with respect to the fixing screws S2 and are not in contact with the fixing screws S2. The height of the recessed portions 77 in the Z direction is, for example, half the height of the stator core 72 in the Z direction.

When viewed from the Z direction, the protruding portions 76 and the recessed portions 77 are aligned in the radial direction. Further, the protruding portions 76 are aligned with the holding portion 56 in the circumferential direction of the cylindrical portion 74 and are fixed to the base plate 52 by the fixing screws S2. In addition, in FIG. 8, illustration of multiple dividing lines representing the laminated state of the stator core 72 is omitted.

(First Core Plate)

Figure 9:
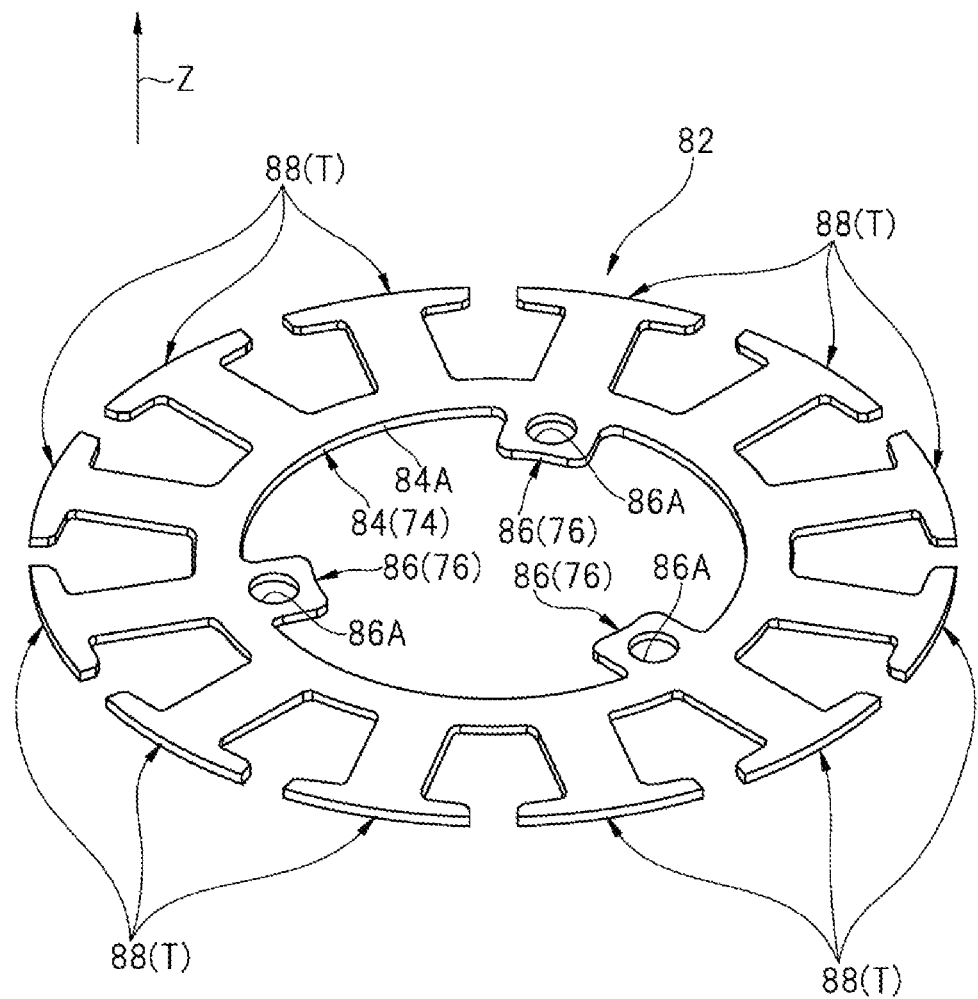
FIG. 9 is a perspective view of the first core plate forming the upper portion of the stator core in FIG. 6.

As shown in FIG. 9, the first core plate 82 has a predetermined thickness in the Z direction. The first core plate 82 includes an annular portion 84, three inner protruding portions 86, and twelve outer protruding portions 88. The annular portion 84 has an annular shape when viewed from the Z direction. The annular portion 84 forms a part of the cylindrical portion 74 in the Z direction.

The inner protruding portions 86 protrude from the inner circumferential surface 84A of the annular portion 84 to the inside in the radial direction and forms part the protruding portions 76 in the Z direction. The three inner protruding portions 86 are spaced at equal intervals in the circumferential direction. On the inner protruding portions 86, hole portions 86A are formed, which penetrate in the Z direction.

The outer protruding portions 88 protrude from the annular portion 84 to the outside in the radial direction and form part of the teeth T in the Z direction. The twelve outer protruding portions 88 are spaced at equal intervals in the circumferential direction. The outer protruding portions 88 are formed into a T-shape when viewed from the Z direction.

(Second Core Plate)

Figure 10:
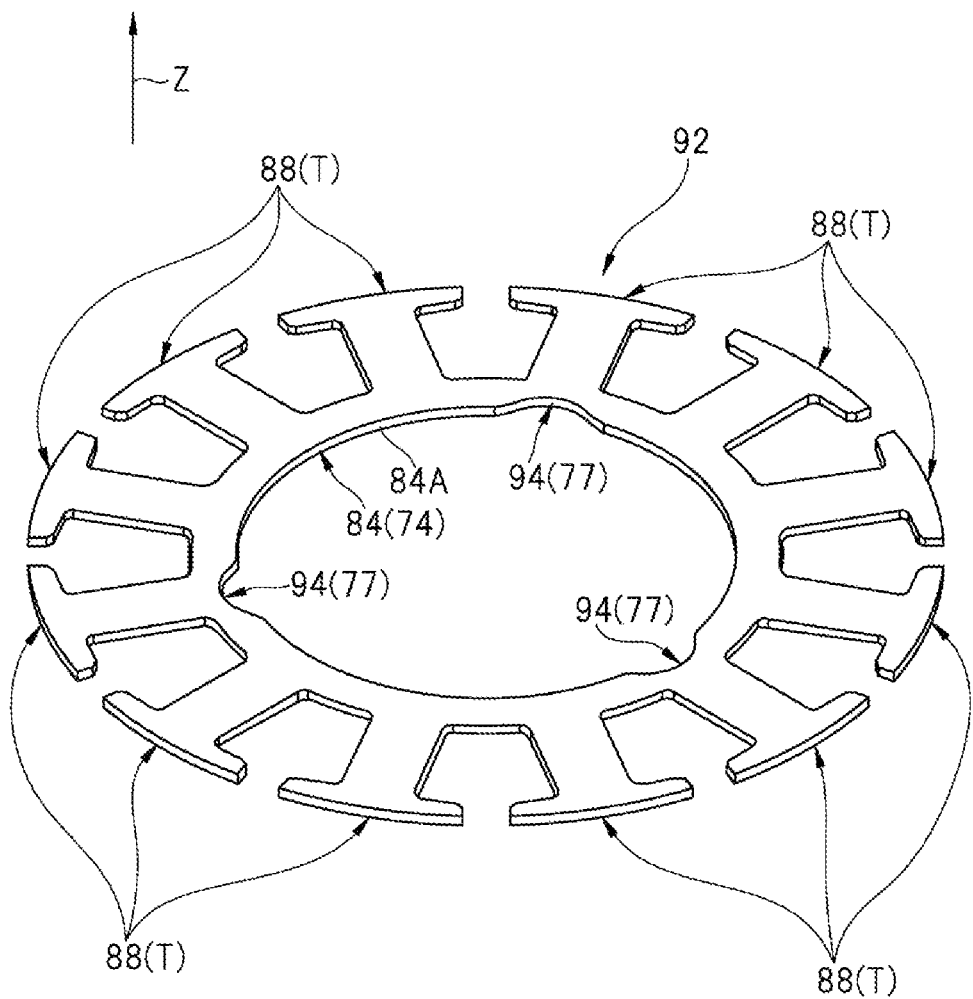
FIG. 10 is a perspective view of the second core plate forming the lower portion of the stator core in FIG. 6.

As shown in FIG. 10, the second core plate 92 has a predetermined thickness in the Z direction. The second core plate 92 includes an annular portion 84, three notch portions 94, and twelve outer protruding portions 88. The three notch portions 94 are recessed toward the outside in the radial direction from the inner circumferential surface 84A of the annular portion 84 and form part of the recessed portions 77 in the Z direction.

Figure 11:
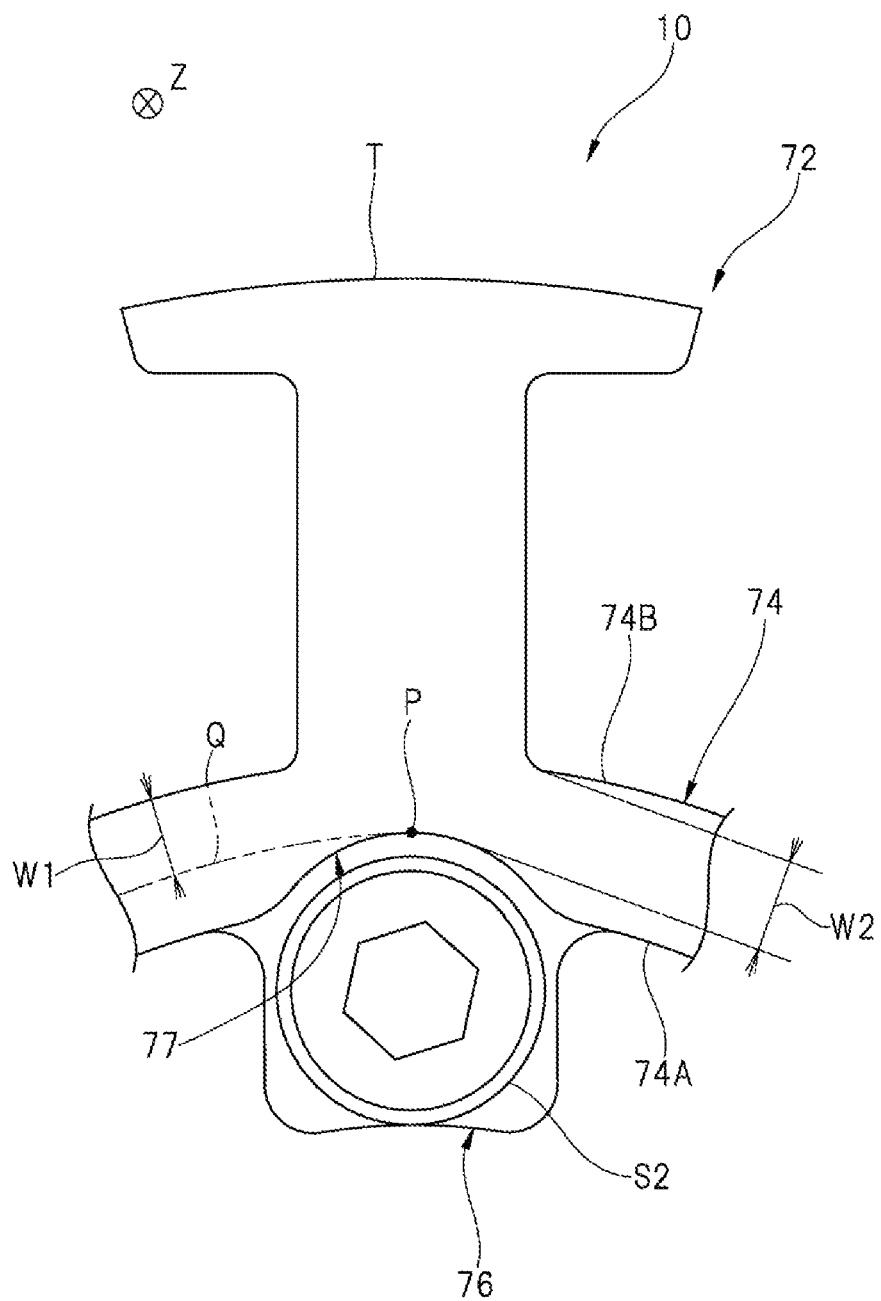
FIG. 11 is a diagram showing the configuration of the teeth, the protruding portion, the recessed portion, and the fixing screws of the stator core.

As shown in FIG. 11, in the stator core 72, the recessed portions 77 are provided on portions of the inner circumferential surface 74A that is aligned with the fixing screws S2 and the teeth T in the radial direction. In other words, the protruding portions 76 and the recessed portions 77 are aligned with the teeth T in the radial direction. A virtual arc that has the same center as the cylindrical portion 74 and passes through the vertex P of the arc of the recessed portions 77 is represented by a virtual line Q. When it is assumed that the recessed portion 77 is formed between two teeth T in the circumferential direction of the cylindrical portion 74, the position of the virtual line Q in the radial direction represents the possible positions of the vertex P.

As a comparative example, when the recessed portion 77 is formed on the portion of the cylindrical portion 74 between two teeth T, the radial width from the virtual line Q to the outer circumferential surface 74B becomes the magnetic path width W1 in the comparative example.

On the other hand, in this embodiment, the minimum width of the magnetic path widths from the recessed portions 77 to the outer circumferential surfaces 74B is defined as the magnetic path width W2. Here, W2>W1.

<Insulator>

As shown in FIG. 4, the insulator 96, which is made of an insulator such as plastic, covers the upper end portion and the lower end portion of the cylindrical portion 74 and the portion around which the conductive wire LW of the teeth T is wound. The insulator 96 does not cover the outer circumferential surface of the teeth T.

<Terminal>

A terminal 98 is provided at the upper edge portion of the insulator 96. The terminal 98 is a terminal portion that supplies a current supplied at a predetermined timing from a controller (not shown) to the conductive wire LW. Specifically, the terminal 98 has a first terminal 98A for the first phase, a second terminal 98B for the second phase, and a third terminal 98C for the third phase, arranged in sequence in the circumferential direction of the cylindrical portion 74.

As an example, the brushless motor portion 60 includes a total of twelve teeth T (in other words, a total of twelve slots). Moreover, the brushless motor portion 60 is provided with a 14-pole magnet MG. That is, the brushless motor portion 60 according to this embodiment is a "14-pole-12-slot" brushless motor. The greatest common divisor of the number of poles and the number of slots in the brushless motor portion 60 is 2.

<Configuration of Stator Core and Each Component>

As shown in FIG. 5, a part of the rotor shaft SH1 in the Z direction and a part of the rotor yoke 64 in the Z direction (part of the boss portion 65, flange 66, and vertical wall 67) are inserted inside the cylindrical portion 74. In addition, in FIG. 5, a virtual line UL representing the position of the upper end of the stator core 72 and a virtual line BL representing the position of the lower end of the stator core 72 are shown by two-dot chain lines. In other words, the space between the virtual line UL and the virtual line BL means the space inside the cylindrical portion 74.

A part of each of the first ball bearing B1 and the second ball bearing B2 in the Z direction is configured inside the cylindrical portion 74. A part of the holding portion 56 in the Z direction is positioned inside the cylindrical portion 74. A part of the attachment wall 46 in the Z direction (upper end portion) is positioned inside the cylindrical portion 74. The protruding portions 76 and the fixing screws S2 are positioned inside the cylindrical portion 74.

In this way, at least a part of each of the first ball bearing B1, the second ball bearing B2, the rotor yoke 64, the base plate 52, the fixing screws S2, and the motor housing 42 in the Z direction are positioned inside the cylindrical portion 74. In other words, these components are positioned so as to have an overlap in the Z direction with the stator core 72 (so that at least a part in the Z direction overlaps the stator core 72 in the radial direction).

Effect of this Embodiment

Figure 12:
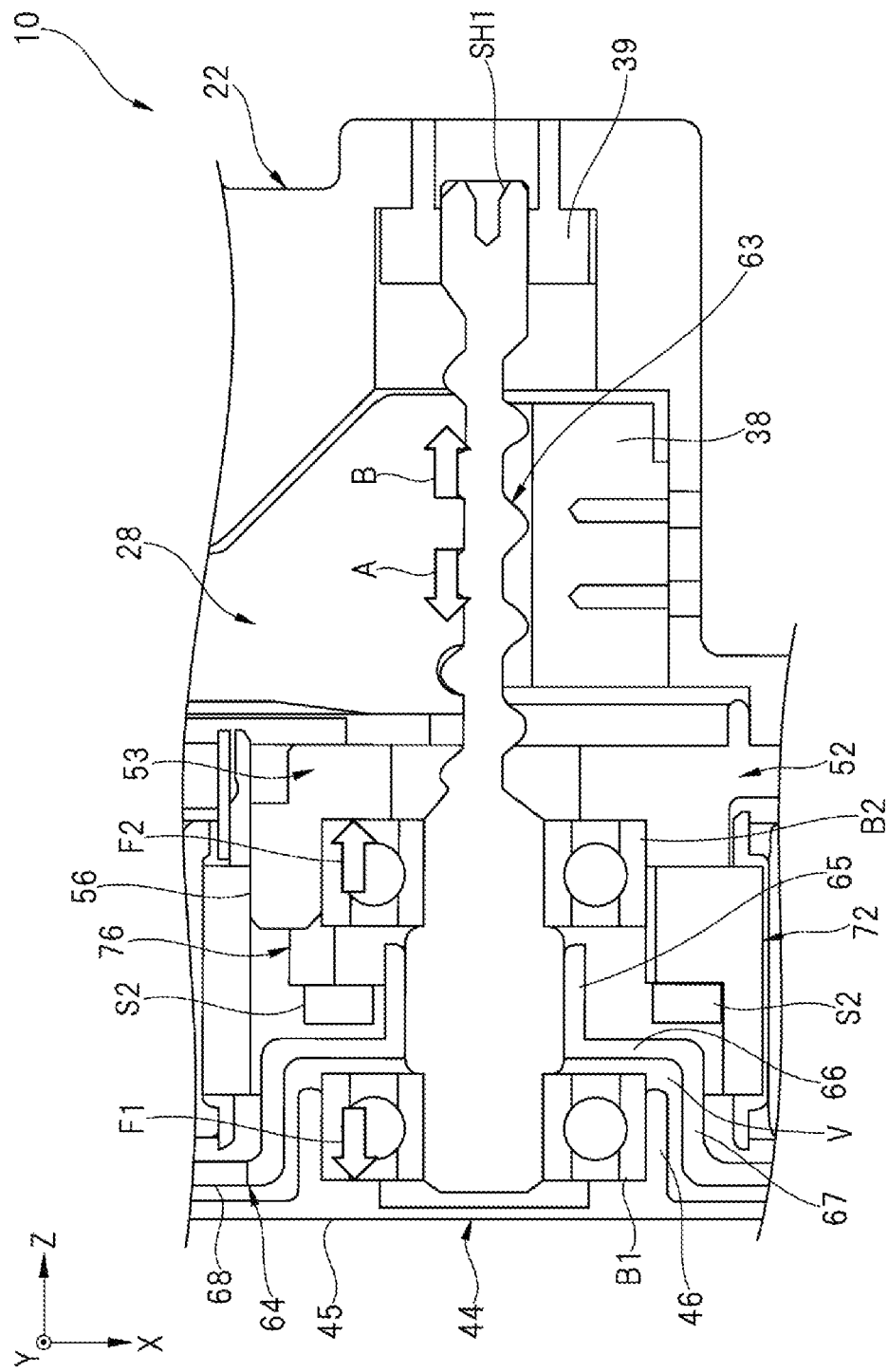
FIG. 12 is a diagram showing the state in which the first ball bearing and the second ball bearing receive a thrust load while the rotor shaft is rotating the helical gear.

As shown in FIG. 12, in the wiper motor 10, the rotor yoke 64 and the rotor shaft SH1 are rotated by energizing the conductive wire LW (FIG. 4). As the rotor shaft SH1 rotates, the helical gear 28 and the output shaft SH2 (FIG. 2) are rotated. In the pinion gear 63 of the rotor shaft SH1, a reaction force A (arrow A) directed toward the lower side in the Z direction and a reaction force B (arrow B) directed toward the upper side in the Z direction are acted on the engaging portion with the helical gear 28. In other words, on the rotor shaft SH1, a thrust load F1 acts toward the lower side in the Z direction, and a thrust load F2 acts toward the upper side in the Z direction. In addition, in FIG. 12, in order to make the reaction force A, the reaction force B, the thrust load F1, and the thrust load F2 easier to see, hatching of each member is omitted.

Here, the first ball bearing B1 receives the thrust load F1 due to the reaction force A. The bottom wall 45 of the motor housing 42 resists the thrust load F1 by receiving the thrust load F1 at a contact portion with the first ball bearing B1.

On the other hand, the second ball bearing B2 receives the thrust load F2 due to the reaction force B. The main body portion 53 of the base plate 52 resists the thrust load F2 by receiving the thrust load F2 at a contact portion with the second ball bearing B2. In this way, the motor housing 42 receives the thrust load F1, and the base plate 52 receives the thrust load F2, thereby suppressing the position shift of the rotor shaft SH1 in the Z direction.

As shown in FIG. 5, the upper end portion of the first ball bearing B1, the lower portion of the second ball bearing B2, the center portion of the rotor yoke 64, the holding portion 56 of the base plate 52, the fixing screws S2, and the upper end portion of the attachment wall 46 are accommodated inside the stator core 72. Thus, compared to a configuration in which these portions are positioned outside the stator core 72, the size of the wiper motor 10 in the Z direction may be reduced. Furthermore, the second ball bearing B2 is positioned on the inside in the radial direction compared to the protruding portions 76 of the stator core 72. Thus, compared to a configuration in which the second ball bearing B2 and the protruding portions 76 are aligned in the Z direction, the size of the wiper motor 10 in the Z direction may be further reduced.

Figure 13A:
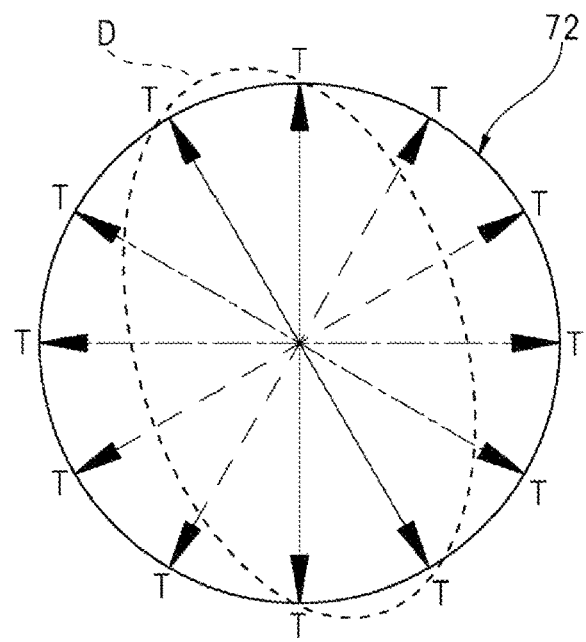
FIG. 13A is a diagram schematically showing the electromagnetic excitation force mode (secondary mode of deformation) that acts on the stator core when the rotor shaft is rotating.

FIG. 13A schematically shows the electromagnetic excitation force mode that acts on the stator core 72 when the rotor shaft SH1 (FIG. 2) is rotating. The ellipse D represents the secondary mode of the deformation.

Figure 13B:
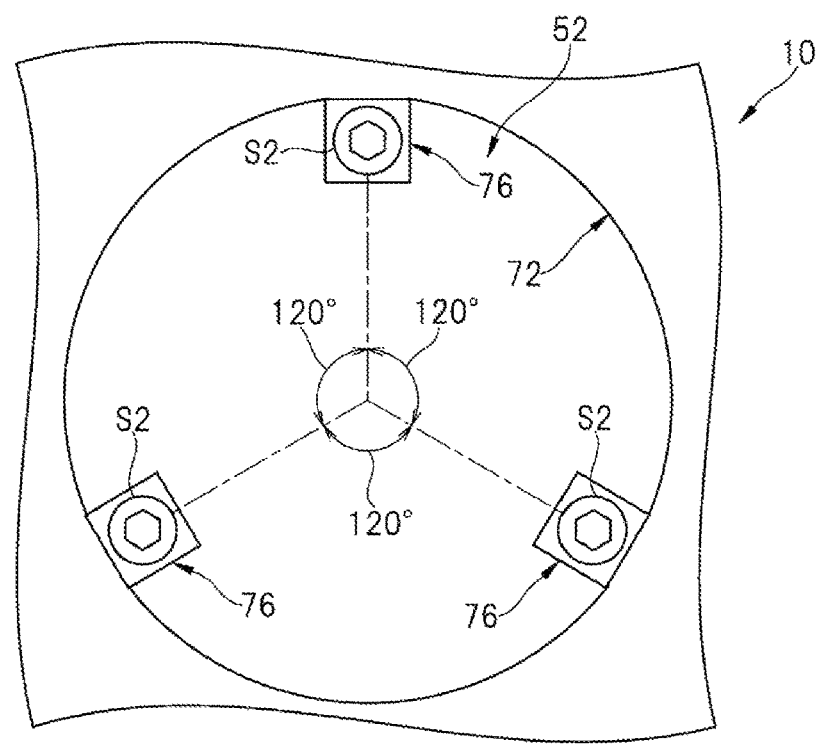
FIG. 13B is a diagram showing the state in which three of the protruding portions of the stator core are spaced at equal intervals in the circumferential direction.

As shown in FIG. 13B, in the wiper motor 10, the stator core 72 is fixed to the base plate 52 at three fixing points at a pitch of 120°. This suppresses the deformation shown by the ellipse D (FIG. 13A) in the stator core 72, so that vibration may be reduced. In other words, the secondary mode of the deformation of the stator core 72 may be suppressed with the minimum number of fixing points.

As shown in FIG. 11, in the wiper motor 10, the recessed portions 77 for avoiding the fixing screws S2 are aligned with the teeth T and in the radial direction. In other words, the recessed portions 77 are positioned at the back of the teeth T. As a result, the magnetic path width W2 obtained in the stator core 72 becomes larger than the virtual magnetic path width W1 when the recessed portion 77 is formed between two teeth T. In this way, the magnetic path width flowing to the back of the teeth T is easier to be ensured, so that the magnetic saturation in the wiper motor 10 may be reduced.

In addition, in this embodiment, the number of poles and the number of slots is set to 14 poles and 12 slots, or 10 poles and 12 slots, so that the greatest common divisor of the number of poles and the number of slots is 2. As for the configurations in which the greatest common divisor of the number of poles and the number of slots is 2, patterns of 4 poles and 6 slots and 8 poles and 6 slots may be cited as comparative examples. Here, in the pattern of this embodiment, compared to the pattern in the comparative example, the main magnetic flux per pole is smaller and the magnetic path width at the back of the teeth T is narrower. Thus, as described above, by using the configuration in which the teeth T and the recessed portions 77 are aligned in the radial direction, the effect of securing the magnetic path width is greater than that of the comparative example.

Hereinafter, the operation of the wiper motor 10 is summarized below with reference to FIG. 1 to FIG. 13B.

In the wiper motor 10, at least a part of each of the first ball bearing B1 and the second ball bearing B2 is configured inside the cylindrical portion 74. Thus, the first ball bearing B1 and the second ball bearing B2 are positioned close to each other. Furthermore, at a position near the portion where the boss portion 65 of the rotor shaft SH1 is fixed, each of the first ball bearing B1 and the second ball bearing B2 rotatably supports the rotor shaft SH1. This increases the rigidity against external forces acting on the rotor shaft SH1.

When the rotor yoke 64 is rotating, the rotor shaft SH1 rotates the gear portion 20, thereby rotating the output shaft SH2. At this time, if the rotor yoke 64 whirls around, the portion of the rotor shaft SH1 that is not fixed to the rotor yoke 64 may deflect against the portion fixed to the rotor yoke 64. Here, as mentioned above, by the first ball bearing B1 and the second ball bearing B2, since the rigidity of the rotor shaft SH1 is increased, the deflection of the rotor shaft SH1 when the rotor yoke 64 is rotating may be suppressed.

Furthermore, in the wiper motor 10, when the rotor yoke 64 rotates with respect to the stator core 72, the rotor shaft SH1 rotates the gear portion 20, thereby rotating the output shaft SH2. At this time, at the engaging portion between the gear portion 20 (helical gear 28) and the rotor shaft SH1 (pinion gear 63), the thrust loads F1 and F2, which are the reaction forces from the gear portion 20, are generated toward two sides in the Z direction of the rotor shaft SH1.

Here, at the contact portion between the first ball bearing B1 and the motor housing 42, the motor housing 42 resists the thrust load F1 by exerting a reaction force against the thrust load F1 acting toward the lower side in the Z direction. At the contact portion between the second ball bearing B2 and the base plate 52, the base plate 52 resists the thrust load F2 by exerting a reaction force against the thrust load F2 acting toward the upper side in the Z direction. In this way, the position shift of the rotor shaft SH1 in the Z direction may be suppressed.

In the wiper motor 10, compared to the configuration where the holding portion 56 and the cylindrical portion 74 are aligned in the Z direction, since at least a part of the holding portion 56 is positioned inside the cylindrical portion 74, the total height of the base plate 52 and the stator core 72 in the Z direction is reduced. Thereby, the size of the wiper motor 10 in the Z direction may be reduced.

In the wiper motor 10, since the protruding portions 76 fixed to the base plate 52 are positioned inside the cylindrical portion 74, the protruding portions 76 are prevented from getting in the way when winding the conductive wire LW around multiple teeth T. Furthermore, with the protruding portions 76 and the holding portion 56 aligned in the circumferential direction, the protruding portions 76 and the holding portion 56 are aligned in the Z direction, and compared to a configuration in which the protruding portions 76 and the holding portion 56 are not aligned in the Z direction, the size of the wiper motor 10 in the Z direction may be reduced.

In the wiper motor 10, when the electromagnetic force generated in the coil portions C acts on the stator core 72 as an electromagnetic excitation force, the stator core 72 vibrates. That is, the stator core 72 has a vibration mode. Here, since the three protruding portions 76 are positioned at equal intervals in the circumferential direction, the movement of the ellipse shape of the stator core 72 is restricted, so vibrations caused by the deformation of the secondary mode of the stator core 72 may be suppressed.

In the wiper motor 10, by providing the recessed portions 77, gaps in the radial direction are formed between the fixing screws S2 and the stator core 72. As a result, when the protruding portions 76 are fixed to the base plate 52 by the fixing screws S2, since the fixing screws S2 and the stator core 72 are less likely to interfere with each other, the stator core 72 may be fixed to the base plate 52 more easily. Furthermore, since the recessed portions 77 are aligned with the teeth T in the radial direction, narrower portions in the radial direction are less likely to be formed in the stator core 72, thereby making it easier to secure the magnetic path width and reducing the magnetic saturation.

In the wiper motor 10, by laminating multiple first core plates 82 and multiple second core plates 92 in the Z direction, eddy currents may be suppressed from being generated in the interior of the stator core 72. Further, by laminating multiple inner protruding portions 86 and multiple notch portions 94 in the Z direction, the protruding portions 76 and the recessed portions 77 are formed. In this way, the need to form the protruding portions 76 and the recessed portions 77 by cutting, etc., is eliminated after laminating multiple core plates in the Z direction, thereby reducing the number of processing steps while suppressing eddy currents.

In the wiper motor 10, since the first ball bearing B1 is positioned in the accommodating space V of the rotor yoke 64, the position of the first ball bearing B1 in the Z direction may be brought closer to the center position of the cylindrical portion 74 in the Z direction. As a result, compared to a configuration without the accommodating space V, more parts of the first ball bearing B1 may be accommodated inside the cylindrical portion 74, and the size of the wiper motor 10 in the Z direction may be reduced.

In the wiper motor 10, since the part of the attachment wall 46 in the Z direction is positioned inside the cylindrical portion 74, the total height of the motor housing 42 and the stator core 72 in the Z direction is reduced. Thereby, the size of the wiper motor 10 in the Z direction may be reduced.

In the wiper motor 10, compared to the configuration in which the motor housing 42 and the base plate 52 are each fixed to different members, relative position shift between the motor housing 42 and the base plate 52 is suppressed. In this way, the position shift of the first ball bearing B1 and the second ball bearing B2 with respect to the central axis CA is suppressed, thereby suppressing the rotor shaft SH1 from tilting with respect to the Z direction.

According to the embodiment of the disclosure, position shift of the rotor shaft SH1 in the Z direction is suppressed in the part where the rotor shaft SH1 is rotated, thereby suppressing the variation in output performance from product to product. In addition, the production efficiency may be increased, the manufacturing energy may be saved, and the greenhouse gas emissions may be suppressed. In this way, especially Goal 7 (ensure access to affordable, reliable, sustainable and modern energy for all) and Goal 13 (take urgent action to combat climate change and its impacts) in the Sustainable Development Goals (SDGs) set by the United Nations may be realized.

Modified Example

In addition, the disclosure is not limited to the embodiment described above, but may be implemented in a variety of different forms within the scope of the technical concept. A modified example is described below.

In the wiper motor 10, the entire first ball bearing B1 and the entire second ball bearing B2 may be configured inside the cylindrical portion 74. Further, the entire first ball bearing B1 may be configured inside the cylindrical portion 74, and a part of the second ball bearing B2 may be configured inside the cylindrical portion 74. Alternatively, the entire second ball bearing B2 may be configured inside the cylindrical part 74, and a part of the first ball bearing B1 may be configured inside the cylindrical portion 74.

The entire holding portion 56 may be positioned inside the cylindrical portion 74. Further, a part of the holding portion 56 may be positioned inside the cylindrical portion 74.

The number of protruding portions 76 is not limited to three, but may be one, two, or more than four. The protruding portions 76 only need to be fixed to the base plate 52, and for example, another plate-shaped member may be inserted between the protruding portions 76 and the base plate 52. Multiple protruding portions 76 other than three may be spaced at equal intervals in the circumferential direction. Furthermore, the protruding portions 76 may have unequal intervals in the circumferential direction.

The protruding portions 76 are not limited to being fixed to the base plate 52 using the fixing screws S2, but may be fixed to the base plate 52 using an adhesive. The protruding portions 76 and the recessed portions 77 may be configured not aligned with the teeth T in the radial direction.

The stator core 72 is not limited to one formed by laminating multiple first core plates 82 and multiple second core plates 92 in the Z direction, but may be formed as one block body by molding or cutting.

The rotor yoke 64 does not need to have the flange 66 and the vertical wall 67. In other words, the rotor yoke 64 does not need to have the accommodating space V. In this case, by having a configuration in which the boss portion 65 is sandwiched between the first ball bearing B1 and the rotor shaft SH1, a part of the first ball bearing B1 may be configured inside the stator core 72.

The attachment wall 46 does not need to be positioned inside the cylindrical portion 74. Further, the motor housing 42 does not need to have the attachment wall 46. For example, the outer circumferential portion of the first ball bearing B1 may be fixed to the motor housing 42 by adhesive or the like. The motor housing 42 and the base plate 52 may be fixed to separate members.

In this embodiment, the brushless motor portion 60 is shown as a "14-pole-12-slot type" brushless motor, but may also be configured as a "10-pole-12-slot type" brushless motor. The motor device is not limited to the wiper motor 10 (brushless motor portion 60), but may also be a brushless sunroof motor, a brushless power window motor, a brushless power seat motor, or the like.

In one aspect of the disclosure, at least a part of each of the first bearing and the second bearing is configured inside the cylindrical portion. For this reason, the first bearing and the second bearing are positioned close to each other. Furthermore, at a position near the portion where the rotor yoke of the rotor shaft is fixed, each of the first bearing and the second bearing rotatably supports the rotor shaft. This increases the rigidity against external forces acting on the rotor shaft.

When the rotor yoke is rotating, the rotor shaft rotates the gear portion, thereby rotating the output shaft. At this time, if the rotor yoke whirls around, the portion of the rotor shaft that is not fixed to the rotor yoke may deflect against the portion fixed to the rotor yoke. Here, as mentioned above, by the first bearing and the second bearing, since the rigidity of the rotor shaft is increased, the deflection of the rotor shaft when the rotor yoke is rotating may be suppressed.

What is claimed is:

1. A motor device, comprising:
   a rotor shaft, configured parallel to an output shaft provided on a gear portion and rotating the gear portion;
   a rotor yoke, fixed to the rotor shaft;
   a stator core, having a cylindrical portion into which a part of the rotor shaft and a part of the rotor yoke are inserted;
   a first bearing, fixed to a motor housing, which is positioned on one side in an axial direction of the rotor shaft with respect to the stator core, and rotatably supporting the rotor shaft; and
   a second bearing, fixed to a base plate, which is positioned on other side in the axial direction with respect to the stator core, and rotatably supporting the rotor shaft,
   wherein at least a part of each of the first bearing and the second bearing is configured inside the cylindrical portion.

2. The motor device according to claim 1, wherein
   the base plate comprises a holding portion that holds the second bearing, and
   at least a part of the holding portion is positioned inside the cylindrical portion.

3. The motor device according to claim 2, wherein
   the stator core comprises at least one protruding portion that protrudes from an inner circumferential surface of the cylindrical portion to an inside in a radial direction of the cylindrical portion, and
   the protruding portion is aligned with the holding portion in a circumferential direction of the cylindrical portion and are fixed to the base plate.

4. The motor device according to claim 3, wherein three of the protruding portions are spaced at equal intervals in the circumferential direction.

5. The motor device according to claim 4, comprising:
   a plurality of teeth, protruding from the cylindrical portion to an outside in the radial direction;
   a screw member, fixing the protruding portion to the base plate; and
   a recessed portion, recessed toward the teeth on a portion of the inner circumferential surface positioned between the screw member and the teeth,
   wherein the protruding portion and the recessed portion are aligned in the radial direction when viewed from the axial direction.

6. The motor device according to claim 5, wherein
   the stator core comprises a plurality of first core plates and a plurality of second core plates laminated in the axial direction, respectively, wherein the first core plate comprises: an annular portion, which forms a part of the cylindrical portion; and an inner protruding portion, which protrudes from the annular portion to the inside in the radial direction and forms a part of the protruding portion, and the second core plate comprises: an annular portion, which forms another part of the cylindrical portion; and a notch portion, which is recessed from an inner circumferential surface of the annular portion toward the outside in the radial direction and forms a part of the recessed portion.

7. The motor device according to claim 6, wherein the rotor yoke comprises: a flange portion, which is formed from the rotor shaft toward the outside in the radial direction; and a wall portion, which extends from an outer circumferential portion of the flange portion to the one side in the axial direction, and the first bearing is positioned in an accommodating space surrounded by the flange portion and the wall portion.

8. The motor device according to claim 7, wherein the motor housing comprises an attachment portion to which the first bearing is attached, and a part of the attachment portion in the axial direction is positioned inside the cylindrical portion.

9. The motor device according to claim 1, wherein the motor housing is fixed to the base plate.

* * * * *